July 25, 1933.  H. B. LEE  1,919,232
VALVE
Filed Feb. 8, 1932  3 Sheets-Sheet 1

INVENTOR
HENRY B. LEE
BY
Bohleber + Ledbetter
HIS ATTORNEYS

July 25, 1933.  H. B. LEE  1,919,232
VALVE
Filed Feb. 8, 1932   3 Sheets-Sheet 2

INVENTOR
HENRY B. LEE
HIS ATTORNEYS

July 25, 1933.  H. B. LEE  1,919,232
VALVE
Filed Feb. 8, 1932   3 Sheets-Sheet 3

INVENTOR
HENRY B. LEE
BY
Bohleber + Ledbetter
HIS ATTORNEYS

Patented July 25, 1933

1,919,232

UNITED STATES PATENT OFFICE

HENRY B. LEE, OF TROY, NEW YORK, ASSIGNOR TO THE LUDLOW VALVE MANUFACTURING COMPANY, OF TROY, NEW YORK, A CORPORATION OF NEW JERSEY

VALVE

Application filed February 8, 1932. Serial No. 591,551.

This invention relates to improvements in valves, throttling orifices, metering orifices and like devices for controlling the flow of expansible fluids, for example, steam, although the invention is not limited to the above enumerated devices and is applicable to any fluid having the characteristics or effects of an expansible fluid.

Generally, as heretofore constructed, valves and throttling orifices have not only been extremely noisy when employed for controlling high pressure high density expansible fluids, but have also been subject to the rapid and destructive erosion of their coacting surfaces, owing to the high velocity at which such high pressure elastic expansible fluids tend to flow through a restricted opening, as at the beginning of the opening movement or when a valve in partly open position is used to reduce the pressure of the fluid flowing therethrough.

The rapid and destructive erosion of the coacting surfaces of throttling orifices, including valves, owing to the high velocity at which such high pressure elastic expansible fluids tend to flow through restricted openings, has been reduced by the valve disclosed in my previous patent, Reissue No. 17,824, reissued October 14, 1930. This patent illustrates a valve having coacting male members and female members so constructed and arranged as to form between them a flow passage having a progressively increasing area of flow from the inlet to the outlet; one of said members being formed with a series of flanges and expansion chambers, alternating one with another, and one of said members being movable with respect to its coacting member, whereby the passage past each flange may be coincidentally varied and the velocity of the fluid reduced as a result of the resulting successive reductions of pressure at the respective flanges. Thus the passage defined by each flange and the proximate wall of the coacting member forms what is, in effect, an orifice in a thin plate through which the fluid passes with a resulting decrease of pressure and consequent increase of velocity, which increase of velocity is dissipated and the velocity is further decreased in the subsequently adjacent expansion chamber. By the provision of a series of such alternating flanges and expansion chambers, the pressure is reduced, step by step, from a predetermined maximum to a predetermined minimum.

One object of the present invention is an expansible fluid valve which is an improvement over the valve of my previous patent.

Another object of the invention is to obtain, in such a valve, a greater range of effectiveness of each successive reduction of the velocity of the fluid.

The invention also seeks, in a valve or other throttling orifice a greater efficiency in the pressure reduction at each stage whereby the same pressure reduction is obtained as that of the patented valve, either with flow passages of relatively greater cross-sectional area or with a fewer number of pressure reduction stages in a flow passage of the same cross-sectional area as the patented valve.

It is a further object of the invention to provide a throttling orifice which shall be self cleaning and prevent the deposit or collection of matter from the fluid in the expansion chambers.

The invention also seeks a valve which reduces the erosion of the valve seat and/or valve when the valve first moves from closed position to partially open position in the course of its movement to substantially fully open position.

In carrying out the invention, in its preferred embodiment, one of the coacting members is formed with one or a plurality of ribs, each of which, with the surface of the coacting member, forms, in partially open position, what is, in effect, an "orifice in a thin plate" and the fluid flowing through each orifice has its pressure reduced a predetermined amount. A portion, at least, of the stream of expansible fluid, after it has passed the orifice and is at a lower pressure but at an increased velocity, is diverted and directed back into the stream, preferably at or about the "vena contracta" thereof, and the turbulence caused by the impingement of the one stream on the other, at a different angle, accompanied by the retardation of the main stream by the counter-current flow of the diverted stream in contact therewith serves, at each stage, to reduce most efficiently the velocity of the fluid, thus affording a greater reduction in pressure or throttling action for a given flow passage or the same pressure drop with a flow passage of larger cross-sectional area or, all other factors being equal, permits the use of an expansion chamber of smaller volumetric capacity than is possible with the disclosure of the patent. To effect the return of a portion of the main stream of expansible fluid in each expansion chamber, the wall thereof is curved from the next succeeding thin plate orifice in the direction of and toward the preceding orifice. Preferably the curvature is such as to afford the highest velocity to the returning fluid, i. e., one shaped substantially to conform to the path taken by the returning fluid or at least not offer obstruction thereto. By such curvature, I have also found that the coacting surfaces are free from deposits of solid matter, for instance, sand, pebbles, hard scale formations, carbon, tar, small steel chips, etc., which are sometimes carried along with the fluid at high velocities, particularly in oil well and oil still discharges, and collect on the surfaces of all valves and throttling orifices and similarly functioning devices heretofore known.

These and other objects of the invention and the means for their attainment will be more apparent from the following detailed description, taken in connection with the accompanying drawings illustrating various embodiments by which the invention may be realized, and in which:—

Figure 4:
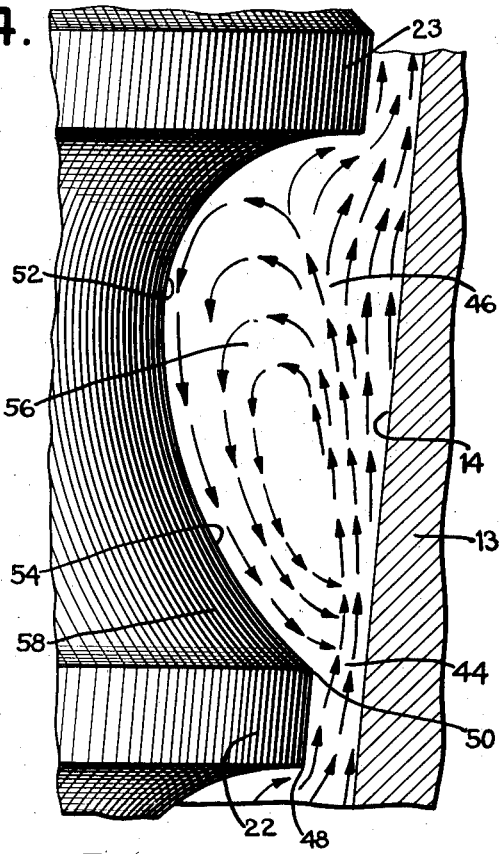
Figure 5:
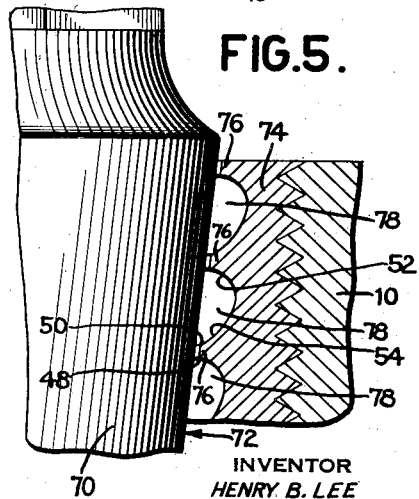

Figure 4 is an enlarged view showing a fragmentary portion of the flow passage with the valve in partly opened or cracked position and with arrows illustrating the different paths of the fluid in passing through the flow passage; and Figure 5 is a view illustrating fragmentary parts of modified coacting male and female members, in which the expansion chambers are formed in the female member, the valve being in partly open position.

Figure 1:
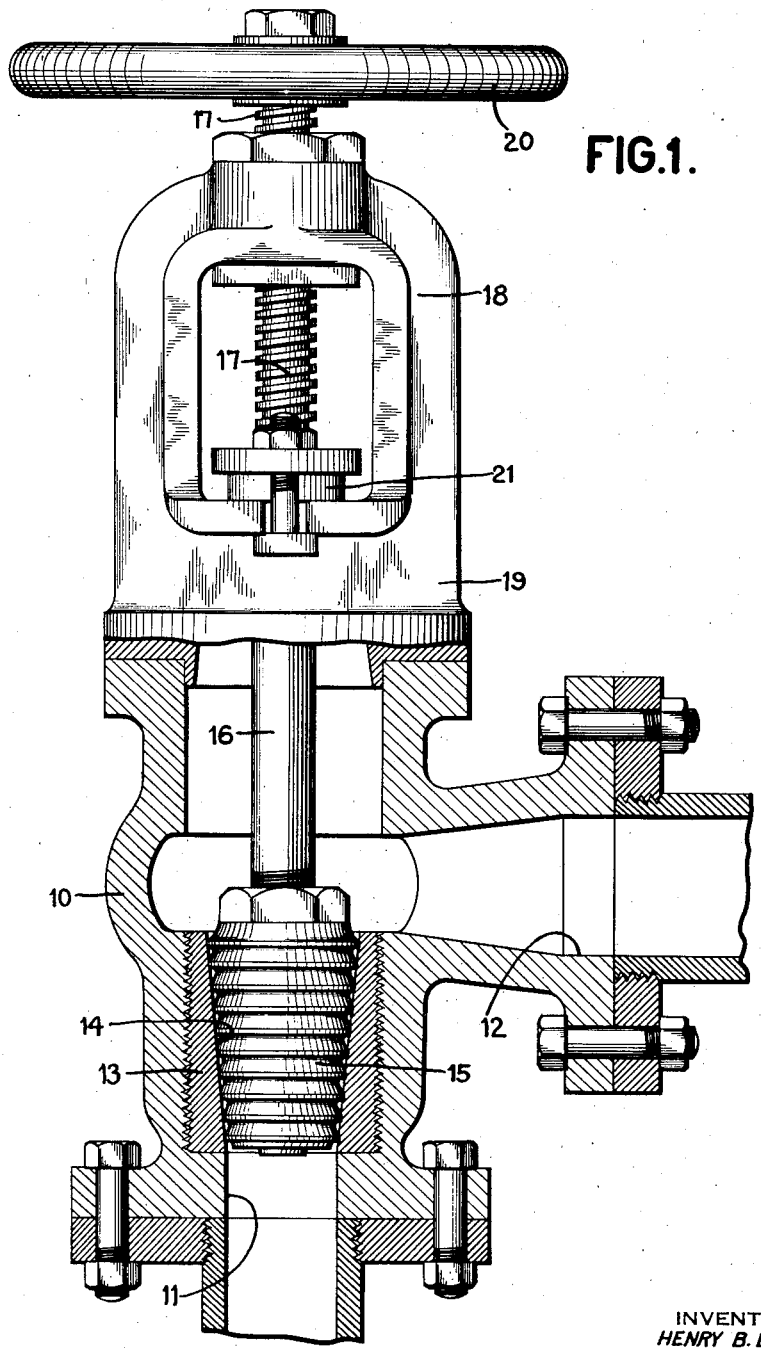
Figure 1 is a view, in longitudinal section and partly in elevation, showing this invention applied to an erosion reducing valve with the cone, i. e., the frusto-conical closure, in closed or sealing position.

In the drawings, the invention is shown as applied to a valve casing 10, Figure 1, having an inlet port 11 and an outlet port 12. Axially in line with the inlet port and in its lower end, the casing 10 is formed with, or otherwise provided with, a tube-like female member portion 13 having a frusto-conical bore. In the embodiment illustrated in Figures 1 and 2, the female member portion of casing 10 has a smooth interior wall 14 and is made as a separate element or thimble which is conveniently threaded or otherwise secured in the wall of the casing 10. It may, if desired, be formed of some material having an inherent resistance to corrosion and capable of withstanding very high temperatures, but in many situations it may not be found necessary to form the surface 14 on a member having different characteristics from that of the casing itself or it may be found desirable to form the casing of wear resistant material, and, in either event, the wall of the casing may itself serve as the tube-like female member upon which the surface 14 is formed. By the term "female member", therefore, is intended any element or portion of the structure upon which the surface 14 is formed.

The female member 13 receives an axially adjustable frusto-conical male member 15. For the purpose of axially adjusting the closure 15 with respect to the female member 13, the same is shown as mounted upon the lower end of a valve stem 16 formed with threads 17 engaging corresponding threads formed in a nut in a yoke 18 on a bonnet 19, which latter, as shown, is secured in any convenient fashion to the upper end of the valve casing 10. The valve stem 16 is provided at its upper end with a hand wheel 20 to move the valve, by translation of the stem, from the closed position shown in Figure 1 to the fully open position of Figure 2 or to any intermediate partially open position. It will be apparent that the male member 15 can be equally well moved between the two extreme positions by rotation of the valve stem or by a combined movement of rotation and translation. The valve stem 16 extends through a packing gland 21 in the bonnet 19.

Figure 3:
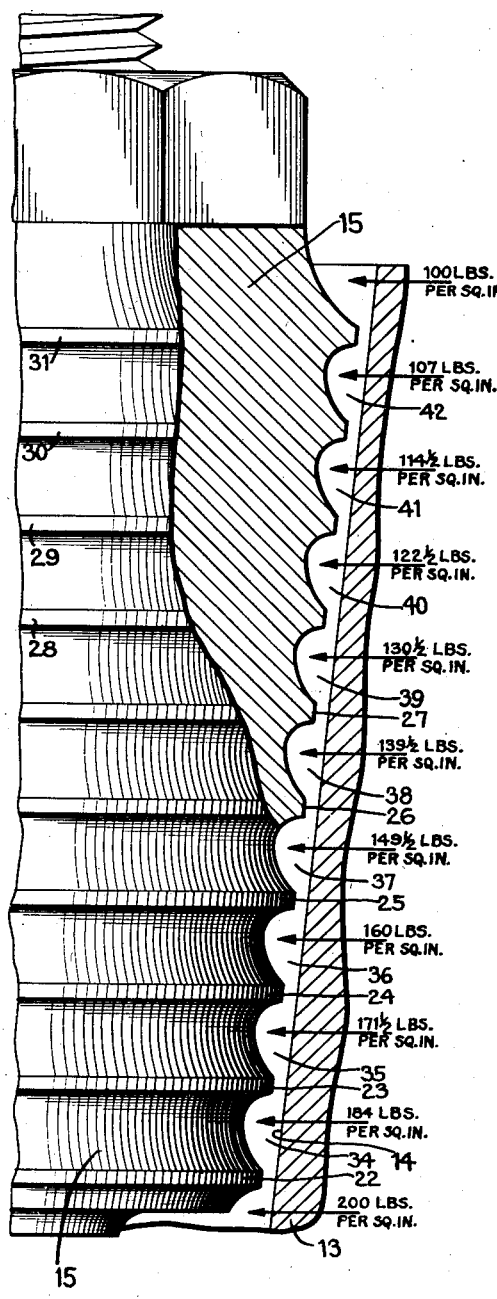
Figure 3 is an enlarged view showing fragmentary parts of the coacting male and female members of the valve shown in Figures 1 and 2, the valve being in "cracked" position and with provision for ten stages of pressure reduction.

For preventing undesirable rise in the velocity of the steam or other elastic expansible fluid expanding between the inlet port 11 and the outlet port 12, the male frusto-conical member 15, above described, is formed with a series of recurring annular portions, lands or ribs, indicated at 22, 23, 24, 25, 26, 27, 28, 29, 30 and 31, Figure 3, and shown as ten in number in the embodiment illustrated, of relatively greater diameter, and annular recessed portions formed by reducing the male member between the ribs to a relatively lesser diameter to form annular expansion chambers 34, 35, 36, 37, 38, 39, 40, 41 and 42.

Figure 2:
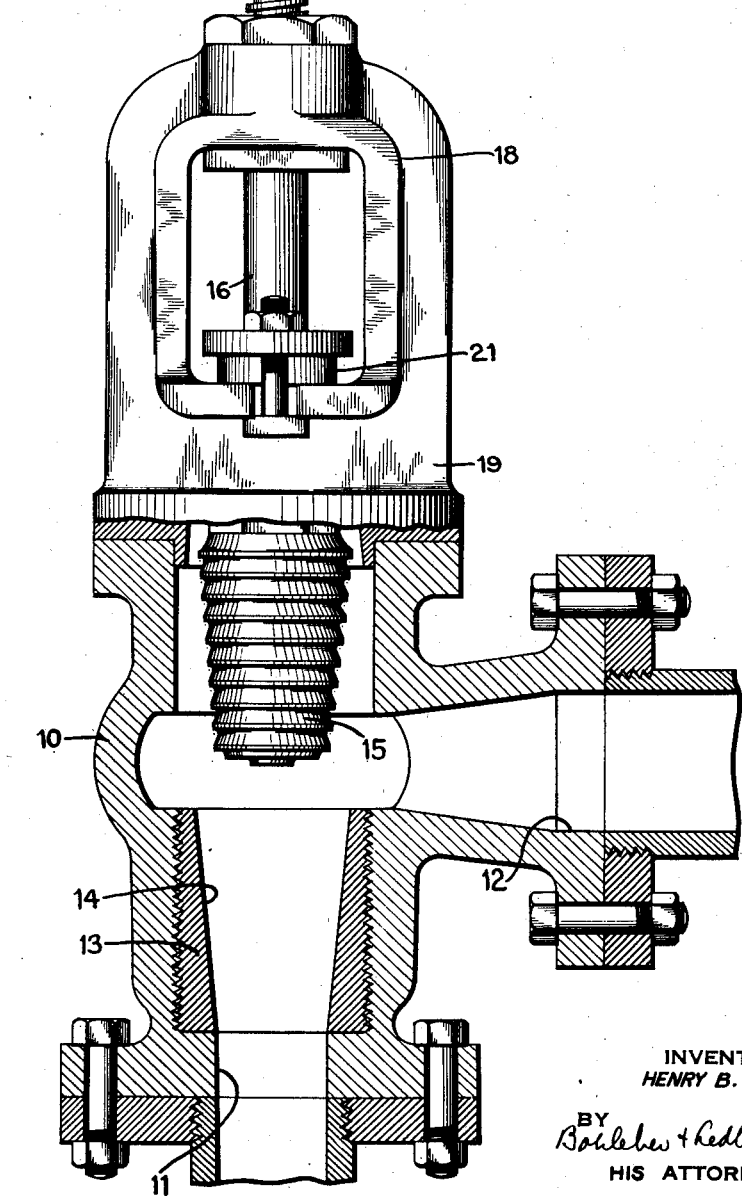
Figure 2 shows the same valve in fully open position.

According to the well known laws governing the flow of steam, for instance, its velocity through an orifice, say, the orifice formed between the valve member 15 and seat 13 adjusted to reduce its pressure from 200 lbs. per square inch to 100 lbs. per square inch, for example, would be approximately at the rate of 1675 feet per second, which would be the velocity of the steam flowing between the inlet 11 and the outlet 12 of the valve shown in Figures 1 and 2 when in a partially open position, as shown, for instance, in Figures 3 and 4, were it not for the interposition of the ribs 22—31 and expansion chambers 34—42, as described. Steam flowing at such a velocity as this would not only cause excessive noise, but would also cause the rapid erosion of the walls of the orifice. As in the valve of my prior patent, since velocity is dependent upon pressure, the prevention of undesirable rise in the velocity is effected by reducing the pressure in two or more steps, instead of in one step, whereby the relatively slight reduction in pressure at each stage results in but slight increased velocity and this velocity is overcome at each stage in the subsequently adjacent expansion chamber.

As has been explained, the rib in conjunction with the adjacent wall forms what is, in effect, an orifice in a thin plate. As an example, the said orifice may be formed by the rib 22, Figure 4, and the face 14 of the wall 13 immediately opposite thereto, and the expansible fluid flowing past this orifice forms a jet as shown by the arrows. At a distance along the center line of the jet equal to one-half the dimension of the opening, the stream contracts to about six tenths of the opening. This contraction of the jet is indicated at 44 and is known as the "vena contracta". As will be understood, the pressure of the fluid is reduced on passing through the thin plate orifice while the velocity is increased so that the velocity at the thin plate orifice is only 0.6 that of the velocity at the "vena contracta". Beyond the "vena contracta", the stream or jet increases in cross-sectional area as shown at 46, that is, it expands, and this expansion in the subsequent expansion chamber 34 results in a reduction of the velocity, as will be understood.

As shown in Figure 4, and as will be appreciated, the ribs 22—31 must be designed according to the theory of the thin plate orifice. For this reason, the flange edge first presented to the oncoming column of fluid and where it contacts on occasion with the coacting or female member must be as sharp as practical although I have found that the sharp corner can be reduced to what may be called a "blunt edge" for all practical purposes. This edge is indicated at 48 in Figure 4. The thickness of rib 22, as well as all the other ribs, that is, the distance between the leading edge 48 and the rear edge 50, which forms the thickness of the wall of the orifice 22, should be as small as possible so as to give the effect of the thin plate. A longer wall of the orifice will give the effect of a "straight short tube orifice" which, as is well known, will increase the velocity and increase the erosion of the coacting parts. Too great a thickness will thus prevent the formation of a "vena contracta". I have found that, as a general rule, the land thickness or distance 48, 50 should be less than 1/16th of an inch.

As shown in Figure 4, the wall of one of the coacting members, in this instance the wall 52 of the expansion chamber of the male member, is curvilinear in outline and is shown as beginning at, say, the rib 23, (considering the direction of flow of the returning portion of the fluid) with a curve of relatively less radius beginning at the subsequent thin plate orifice and gradually merging into a curve of greater radius, at 54, in the direction of the flow of fluid until it merges with the immediately preceding rib 22 at the edge 50. Thus, a portion 56 of the main stream, as the stream expands beyond the "vena contracta", engages with the wall of the expansion chamber and is directed rearwardly and back into the main stream, conveniently, at or about the "vena contracta", thus forming an eddy current. The curvature is primarily such as to give the highest velocity possible for this returning stream. The higher the velocity of the eddy current the greater will be its retarding effect on the main stream at the "vena contracta" because the diverted fluid of the eddy current is flowing in a direction substantially opposite to the direction of the main stream. Although of lower velocity, its velocity is sufficient to have a retarding effect and also since it is directed by the walls into the main stream, in the opposite direction, it tends to cause a turbulence at or about the "vena contracta" which breaks up or opposes the flow of fluid at that point and further tends to retard the flow. The compound curvature of the wall 52, 54 is selected to be that which the returning fluid stream naturally follows and which may be called the "slip stream" thereof, thereby to avoid friction as much as possible, and is such as not to retard or hinder the velocity of the flow of the returning portion in any manner.

It has also been found desirable to provide a valve member so constructed that the ribs are reenforced or strengthened to sustain the high pressure per unit area to which the valve member 15 is subjected when in closed or partially open position. The material at 58 immediately behind the rib (22—31) (considering the direction of flow through the valve) supports and reenforces the rib and gives adequate strength to the structure right out to the outer marginal surface of the rib between the edges 48, 50. Furthermore, the curvature of the wall of the expansion chamber, as described, results in a freedom of clogging of the valve, that is, during use, it is found that there are no deposits of solids from the fluid in the expansion chambers and even after extended use, the surfaces of the expansion chambers will present a clean and burnished appearance although the valve may have been used to throttle fluids carrying a large proportion of solids.

It will be obvious that if the chambers are not properly shaped and if the opening at the orifice is large and the chambers very short or narrow, say, less than 3/16th of an inch wide from rib to rib, the stream will flow or rush by the chambers and subsequent ribs, as in a "straight short tube orifice", or orifice openings, and little step-by-step pressure reduction, will result. No simple proportion of width of chambers can be set down because the character of fluids, their velocities, and pressures vary over a very wide range. As an example of such variations in the character of fluids and their action, oil, as it leaves a high pressure well, contains varying amounts of gas in solution, which gas will expand upon being subjected to a lower pressure and, therefore, the fluid discharged from an oil well can be considered an elastic fluid even though it is cold. The depth of the grooves or expansion chambers in most instances should be not less than ⅓ of their width, i. e., from the edge 50 of one rib to the edge 48 of the next succeeding rib. For large orifice or valve openings wider grooves or chambers will be required than for small orifice or valve openings, but I have found that 3/16ths of an inch is the smallest practical effective width of groove. Most valves will have wider grooves than 3/16ths of an inch. In every instance, however, the depth should not be substantially less than ⅓ the width.

Presuming, for the purpose of description, that a steam pressure of 200 lbs. per square inch exists at the inlet port 11 and that the male member has been properly proportioned and adjusted with respect to the female member 13 so as to permit sufficient fluid to pass to maintain a pressure of 100 lbs. per square inch in the outlet port 12, the functioning of the improved erosion reducing valve may be described as follows:

The rib 22, in conjunction with the adjacent wall 14 of the female member 13 will step the pressure down from 200 lbs. to, say, 184 lbs. by the time it reaches the expansion chamber 34 and will, therefore, only have been exposed to the action of steam moving at the relatively low velocity of 570 feet per second. Now let it be assumed that ten ribs are formed on the frusto-conical valve member 15, and, referring to Figure 3, that these ribs form thin plate orifices, respectively, of a greater cross-sectional area than contemplated with the patented valve, but still within a range of opening in which the effect of a thin plate orifice is obtained. As an example, it may be parenthetically pointed out that whereas, with the expansion chambers such as are illustrated in the patent, the greatest diameter of opening between, say, rib 22 and wall 14 giving the pressure reduction there illustrated for a given fluid is approximately ten thousandths (10/1000ths) of an inch, the valve of the present invention will afford the same pressure reduction for the same fluid and with the same number of stages of pressure reduction, but with expansion chambers of smaller volumetric capacity, with an opening, the diameter of which is twenty thousandths (20/1000ths) of an inch. The rib 23 will serve to step the pressure down from 184 lbs. to 171½ lbs. and will also be subjected to the action of steam moving at the rate of 570 feet per second because, since the difference in pressure between two points determines the velocity of flow between them and, therefore, a relatively slight reduction in pressure results in but slight increased velocity. This step by step reduction of pressure will be continued by the successive ribs, as shown in Figure 3, until by the time the steam reached the outlet port 12, it will have been reduced to 100 lbs. per square inch. This reduction of pressure from 200 to 100 lbs. will thus have been accomplished in the illustrated example of Figure 3 in ten stages without having subjected any part of the valve to the action of steam moving at any greater velocity than 570 feet per second, as compared with a velocity of 1675 feet per second which would have been the velocity were it not for the interposition of the ribs and the expansion chambers and at a greater opening than that possible with the patented valve and with the result that erosion is substantially avoided and silent action obtained.

It will be apparent from the foregoing description that the peculiarly shaped expansion chambers of the valve of this invention gives the same reduction of pressure at each stage with a wider valve opening. It follows therefore, that for a lesser valve opening the pressure reduction may be accomplished with a fewer number of stages. Only one or possibly two stages may be necessary in some situations. Obviously, in view of the greater efficiency of pressure reduction at each stage, the same pressure reduction may be effected with a fewer number of stages of pressure reduction provided the flow passage is restricted. That is, there is a definite relation (with a given fluid) between the cross-sectional area of the flow passage and the number of stages necessary to effect a given pressure reduction.

As is well known in any type of valve used to control fluids at high pressure when the valve is being opened and at what is known as cracked position, the flow of fluid at high pressure through the restricted opening causes an increase in its velocity resulting in erosion of the valve seats and necessitating their frequent replacement. One, two or more stages of pressure reduction may be provided by providing the valve member with the requisite number of ribs and expansion chambers in accordance with this invention so that when the valve moves off its seat in the opening movement, the fluid rushing through the restricted orifice at high velocity will be throttled and no damage to the seat will result. It will thus be seen that the invention is equally applicable to valves of many different types and will probably find widespread use in globe valves, for instance.

The outer peripheral marginal surfaces of the ribs 22–31 conveniently lie all in the same conical plane or surface and the elements of this cone may be parallel to the elements of the conical seating surface, in which event substantially all of the ribs will have sealing contact with the conical seating surface 14. However, the elements of the conical surface of the valve may lie at an angle to the elements of the seating surface in which event only one of the ribs may have sealing contact.

The principle of pressure reduction in a step by step manner forming the subject matter of this application and the action of the expansion chambers on the expanding fluid may be applied equally well in situations where the ribs and expansion chambers are formed on the surface of the female member and the plane surface is present on the frusto-conical valve member. As shown in Figure 5, the valve member 70 is formed with a frusto-conical sealing surface 72. A female member 74 in the valve body 10 is formed with the desired number of recurring annular ribs 76 and alternating expansion chambers 78, the surface contour of which is similar to that described in connection with Figures 3 and 4.

It will thus be seen that a valve throttling orifice, metering orifice or like device has been provided wherein the coacting sealing surfaces of the movable or adjustable member and seat are so constructed as to offer a throttling action to fluid passing therethrough, thereby reducing the velocity and preventing erosion of the coacting surfaces all in a valve effecting the pressure drop in a step by step manner at various different positions of valve adjustment within a range wherein the valve is throttling the fluid, and in such small amounts of expansion at each step that the pressure at each step is high enough to keep the expansion at each step low enough to keep the velocity at each step at some desired rate within a range below the velocity by natural law accompanying the same total pressure reduction in a single step of expansion, and whereby a fewer number of stages of pressure reduction or a greater valve opening, and in many instances, with expansion chambers of smaller volumetric capacity, may be availed of than was possible in the patent, and the invention is equally applicable to valve members and coacting valve seats of many different configurations and for many different purposes.

Various modifications will occur to those skilled in the art in the composition, disposition and configuration of the component elements going to make up the invention as a whole, as well as in the use to which the invention may be put and no limitation is intended by the phraseology of the foregoing description or illustrations, in the accompanying drawings, except as indicated in the accompanying claims.

What is claimed is:—

1. The method of effecting a reduction in the pressure of a fluid having the characteristics of an expansible fluid, which consists in effecting such pressure reduction in a step by step manner in a stream of the fluid flowing through a flow passage and at each step diverting a portion of the fluid back into the said stream and in a direction other than that of said stream.

2. The method of effecting a reduction in the pressure of a fluid having the characteristics of an expansible fluid, which consists in effecting such pressure reduction in a step by step manner in a stream of the fluid flowing through a flow passage and at each step permitting a predetermined degree of expansion and diverting a predetermined portion of the expanding fluid back into the stream in a direction other than the direction of the stream through the flow passage and substantially at a point in the stream where the velocity is highest at that step of pressure reduction to maintain the velocity at each step at some desired rate within a range below the velocity by natural law accompanying the same total pressure reduction in a single step of expansion.

3. A device of the character described comprising a fixed part and an adjustable part forming between them a flow passage increasing in flow area toward its outlet, said passage comprising at least one expansion receiving chamber intermediate the inlet and outlet within which the stream of fluid passing through the flow passage expands, and means associated with said chamber to direct a portion of the expanding fluid as a stream back into the said stream of fluid and in a direction opposed to the direction of flow of said stream to retard the velocity thereof.

4. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said expansion chambers curving from one rib to the next adjacent rib whereby fluid impinging on said wall is deflected and directed opposite to the direction of flow of the fluid and toward and into the stream of fluid whereby the velocity of the fluid is retarded.

5. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said expansion chambers curving gradually from one rib to the next adjacent rib whereby fluid impinging on said wall is deflected and directed opposite to the direction of flow of the fluid and toward and into the stream of fluid whereby the velocity of the fluid is retarded.

6. A valve comprising a fixed part and an adjustable part forming between them when the valve is open a flow passage increasing in flow area from one end toward another, said passage comprising a plurality of expansion receiving chambers, intermediate the valve inlet and outlet, said chambers being defined by annular ribs lying in planes transverse to the flow passage, the wall of said chambers curving gradually from an edge of one rib on a compound curve to the edge of the next adjacent rib whereby fluid impinging on said wall is deflected and directed back opposite to the direction of flow of the fluid and toward and into the stream of fluid whereby the velocity of the fluid is retarded.

7. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected and directed opposite to the direction of flow of the fluid and directed by said curved surface of relatively greater radius toward and into the stream of fluid whereby the velocity of the fluid is retarded.

8. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by ribs and the wall of said chambers curving from one rib to the next adjacent rib, the depth of said chambers from the plane including the outer peripheral edges of the ribs to the innermost surface of the wall of the chambers being substantially one-third the distance between the ribs.

9. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by ribs and the wall of said chambers curving from one rib to the next adjacent rib, the dimension of said chambers from center line of rib to center line of the succeeding rib being substantially not less than three-sixteenths of an inch.

10. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by ribs and the wall of said chambers curving gradually from one rib to the next adjacent rib, the dimension of each rib in the axial direction of the flow passage being substantially not less than one-sixteenth of an inch.

11. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by ribs and the wall of said chambers curving gradually from one rib to the next adjacent rib, the depth of said chambers from the plane including the outer peripheral edges of the ribs to the innermost surface of the wall of the chambers being substantially one-third the distance between the ribs and the dimension of said chambers from center line of rib to center line of succeeding rib being substantially not less than three-sixteenths of an inch.

12. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by ribs and the wall of said chambers curving from one rib to the next adjacent rib, the depth of said chambers from the plane including the outer periperal edges of the ribs to the innermost surface of the wall of the chambers being substantially one-third the distance between the ribs and the dimension of each rib in the axial direction of the flow passage being substantially not less than one-sixteenth of an inch.

13. A valve comprising a fixed part and an adjustable part forming between them when the valve is open a flow passage increasing in flow area toward the outlet, the said passage comprising a plurality of expansion receiving chambers intermediate the valve inlet and outlet, said chambers being defined by ribs and the wall of said chambers curving gradually from one rib to the next adjacent rib, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one-sixteenth of an inch.

14. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said expansion chambers curving gradually from one rib to the next adjacent rib whereby fluid impinging on said wall is deflected and directed opposite to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs.

15. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said expansion chambers curving gradually from one rib to the next adjacent rib whereby fluid impinging on said wall is deflected and directed opposite to the direction of flow of the fluid and toward and into the stream of fluid whereby the velocity of the fluid is retarded, the dimension of said chambers from center line of rib to center line of succeeding rib being substantially not less than three-sixteenths of an inch.

16. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said expansion chambers curving gradually from one rib to the next adjacent rib whereby fluid impinging on said wall is deflected and directed opposite to the direction of flow of the fluid and toward and into the stream of fluid whereby the velocity of the fluid is retarded, the dimension of each rib in the axial direction of the flow passage being substantially not less than one-sixteenth of an inch.

17. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said expansion chambers curving gradually from one rib to the next adjacent rib whereby fluid impinging on said wall is deflected and directed opposite to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one-sixteenth of an inch.

18. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a compound curve to the edge of the next adjacent rib whereby fluid impinging on said wall is deflected and directed opposite to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs.

19. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a compound curve to the edge of the next adjacent rib whereby fluid impinging on said wall is deflected and directed opposite to the direction of flow of the fluid and toward and into the stream of fluid whereby the velocity of the fluid is retarded, the dimension of said chambers from center line of rib to center line of succeeding rib being substantially not less than three-sixteenths of an inch.

20. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a compound curve to the edge of the next adjacent rib whereby fluid impinging on said wall is deflected and directed opposite to the direction of flow of the fluid and toward and into the stream of fluid whereby the velocity of the fluid is retarded, the dimension of each rib in the axial direction of the flow passage being substantially not less than one-sixteenth of an inch.

21. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a compound curve to the edge of the next adjacent rib whereby fluid impinging on said wall is deflected and directed opposite to the direction of flow of the fluid and toward and into the stream of fluid whereby the velocity of the fluid is retarded, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one-sixteenths of an inch.

22. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected and directed opposite to the direction of flow of the fluid and directed by said curved wall of relatively greater radius toward and into the stream of fluid whereby the velocity of the fluid is retarded, the depth of said chambers from the plane including the outer peripheral edges of the ribs to the innermost surface of the wall of the chambers being substantially one-third the distance between the ribs.

23. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected and directed opposite to the direction of flow of the fluid and directed by said curved wall of relatively greater radius toward and into the stream of fluid whereby the velocity of the fluid is retarded, the dimension of said chambers from center line of rib to center line of succeeeding rib being substantially not less than three-sixteenths of an inch.

24. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected and directed opposite to the direction of flow of the fluid and directed by said curved wall of relatively greater radius toward and into the stream of fluid whereby the velocity of the fluid is retarded, the dimension of each rib in the axial direction of the flow passage being substantially not less than one-sixteenth of an inch.

25. A valve comprising a fixed part and an adjustable part forming between them when the valve is open a flow passage increasing in flow area from one end toward another, said passage comprising a plurality of expansion receiving chambers intermediate the valve inlet and outlet, said chambers being defined by annular ribs lying in planes transverse to the flow passage, the wall of said chambers curving gradually from an edge of one rib on a curve of relatively greater radius merging into a curve of relatively lesser radius to an edge of the next succeeding rib whereby expanding fluid impinging on said curved wall of relatively lesser radius is deflected and directed opposite to the direction of flow of the fluid and directed by said curved wall of relatively greater radius toward and into the stream of fluid whereby the velocity of the fluid is retarded, the depth of said chambers from the plane including the outer peripheral edges of the ribs to the innermost surface of the wall of the chambers being substantially one-third the distance between the ribs, the dimension of said chambers from center line of rib to center line of succeeding rib being substantially not less than three-sixteenths of an inch and the dimension of each rib in the axial direction of the flow passage being substantially not less than one-sixteenth of an inch.

HENRY B. LEE.